(12) United States Patent
Burch et al.

(10) Patent No.: US 12,349,630 B2
(45) Date of Patent: Jul. 8, 2025

(54) ELEVATOR SPREADER CONVEYOR SYSTEM

(71) Applicant: DEERE & COMPANY, Moline, IL (US)

(72) Inventors: Guy E. Burch, Thibodaux, LA (US); Kerry J. Morvant, Thibodaux, LA (US); Mark S. Louviere, Houma, LA (US); Dusk S. Mixon, Saint Amant, LA (US); Sandeep B, Pune (IN); Surfraj Fattepur, Pune (IN)

(73) Assignee: Deere & Company, Moline, IL (US)

( * ) Notice: Subject to any disclaimer, the term of this patent is extended or adjusted under 35 U.S.C. 154(b) by 722 days.

(21) Appl. No.: 17/714,319

(22) Filed: Apr. 6, 2022

(65) Prior Publication Data
US 2023/0320276 A1    Oct. 12, 2023

(51) Int. Cl.
| | | |
|---|---|---|
| A01D 90/12 | (2006.01) | |
| A01D 45/10 | (2006.01) | |
| A01D 57/20 | (2006.01) | |
| A01D 90/10 | (2006.01) | |

(52) U.S. Cl.
CPC ............. *A01D 90/12* (2013.01); *A01D 45/10* (2013.01); *A01D 57/20* (2013.01); *A01D 90/10* (2013.01)

(58) Field of Classification Search
CPC ........ A01D 90/12; A01D 45/10; A01D 57/20; A01D 90/10
See application file for complete search history.

(56) References Cited

U.S. PATENT DOCUMENTS

| | | | | |
|---|---|---|---|---|
| 3,828,536 A | * | 8/1974 | Fowler | A01D 45/10 56/502 |
| 3,830,046 A | * | 8/1974 | Rollitt | A01D 45/10 56/16.5 |
| 3,925,199 A | * | 12/1975 | Quick | A01D 45/10 209/139.1 |

(Continued)

FOREIGN PATENT DOCUMENTS

| | | |
|---|---|---|
| BR | 112020024734 A2 | 3/2021 |
| BR | 102019021237 A2 | 4/2021 |

(Continued)

*Primary Examiner* — Arpad Fabian-Kovacs
(74) *Attorney, Agent, or Firm* — Taft Stettinius & Hollister LLP; Stephen F. Rost

(57) ABSTRACT

A harvester that includes an elevator, a spreader conveyor and a secondary extractor. The elevator includes a lower proximal end that receives harvested material and a higher distal end that dispenses the harvested material. The spreader conveyor includes a proximal end that receives the harvested material from the elevator and a distal end that dispenses the harvested material. The secondary extractor includes an inlet and an outlet, where it extracts debris from the harvested material dispensed from the distal end of the spreader conveyor into the inlet and expels the debris out of the outlet. The spreader conveyor can include a spreader belt that rotates in an endless loop, where the harvested material received from the elevator spreads out on the spreader belt. An extractor fan can create air flow to pull debris through the secondary extractor. The spreader conveyor can throw harvested material into the air flow.

19 Claims, 5 Drawing Sheets

(56) References Cited

U.S. PATENT DOCUMENTS

| | | | | |
|---|---|---|---|---|
| 3,946,875 | A * | 3/1976 | Fowler | A01D 45/10 209/643 |
| 3,962,072 | A * | 6/1976 | Ramacher | B07B 4/00 209/140 |
| 4,555,896 | A * | 12/1985 | Stiff | A01D 45/10 56/16.5 |
| 4,924,662 | A * | 5/1990 | Quick | A01D 45/10 56/122 |
| 5,941,768 | A * | 8/1999 | Flamme | B07B 4/02 56/16.5 |
| 6,272,819 | B1 * | 8/2001 | Wendte | A01D 41/1274 56/11.9 |
| 6,928,800 | B2 * | 8/2005 | Huff, Jr. | A01D 45/10 127/2 |
| 10,130,034 | B2 | 11/2018 | Marchesan | |
| 10,412,888 | B2 * | 9/2019 | Matway | A01D 41/1271 |
| 10,959,376 | B2 | 3/2021 | Pereira et al. | |
| 10,999,972 | B2 * | 5/2021 | Hansen | A01D 45/10 |
| 11,528,846 | B2 * | 12/2022 | Hansen | A01D 45/10 |
| 2017/0112063 | A1 * | 4/2017 | Craig | A01D 61/008 |
| 2019/0183052 | A1 | 6/2019 | Craig et al. | |
| 2020/0128743 | A1 * | 4/2020 | Pereira | A01D 61/02 |
| 2021/0112714 | A1 | 4/2021 | Murray et al. | |
| 2024/0107946 | A1 * | 4/2024 | Carpenedo | A01D 43/08 |

FOREIGN PATENT DOCUMENTS

| | | | | |
|---|---|---|---|---|
| BR | 102019021245 A2 | 4/2021 | | |
| CN | 110050577 B | 7/2019 | | |
| CN | 110574548 B | 12/2019 | | |
| CN | 112740902 A | 5/2021 | | |
| DE | 102009005873 A1 * | 7/2010 | | A01D 41/1271 |
| IN | 362289 B | 3/2021 | | |
| WO | WO-2018037543 A1 * | 3/2018 | | A01D 45/10 |
| WO | 2021068048 A1 | 4/2021 | | |
| WO | 2021068049 A1 | 4/2021 | | |

* cited by examiner

ELEVATOR SPREADER CONVEYOR SYSTEM

FIELD OF THE DISCLOSURE

The present disclosure relates to agricultural harvesting machines, and more specifically relates to secondary extractor systems for harvest elevators.

BACKGROUND

Agricultural harvesters usually clean the harvested material by separating it into desired and/or edible crop material and unwanted waste material. This cleaning process can often be difficult. For example, sugar cane harvesters include separators, such as fans, to blow away the waste material. However, the harvested material with both wanted and unwanted material often comes into the cleaning portion as large clumps or slugs which makes it difficult for the air from an extractor fan to pull the unwanted leaves and trash out of the harvested material.

It would be desirable to feed the harvested material in a smooth, continuous flow to improve the effectiveness of the cleaning system to in removing unwanted leaves and other debris out of the harvested material.

SUMMARY

A harvester for harvesting crops is disclosed where the harvester includes an elevator, a spreader conveyor and a secondary extractor. The elevator includes a lower proximal end that receives harvested material and a higher distal end that dispenses the harvested material. The spreader conveyor includes a proximal end that receives the harvested material from the distal end of the elevator and a distal end that dispenses the harvested material. The secondary extractor includes an inlet and an outlet. The secondary extractor extracts debris from the harvested material dispensed from the distal end of the spreader conveyor into the inlet of the secondary extractor and expels the debris out of the outlet of the secondary extractor. The spreader conveyor can include a spreader belt that rotates in an endless loop around the proximal and distal ends of the spreader conveyor, where the harvested material received from the distal end of the elevator spreads out on the spreader belt. The spreader belt can have a smooth, ridged or other type surface.

The secondary extractor can include an extractor fan that creates an air flow to pull air into the inlet of the secondary extractor and expel the air out of the outlet of the secondary extractor. The air flow created by the extractor fan can extract the debris from the harvested material dispensed from the distal end of the spreader conveyor. The spreader conveyor can throw the harvested material dispensed from the distal end of the spreader conveyor into the air flow created by the extractor fan of the secondary extractor. The rotation speed of the spreader belt of the spreader conveyor can be adjustable. The spreader belt of the spreader conveyor can continuously rotate during a harvest operation. The distance from the distal end of the spreader conveyor to the air inlet of the secondary extractor can be adjustable. The angle of the air inlet of the secondary extractor relative to the spreader conveyor can be adjustable.

Desired crop material in the harvested material can be dispensed into a wagon and not drawn into the inlet of the secondary extractor, and the spreader conveyor can dispense the desired crop material into the wagon.

The elevator can throw or drop the harvested material dispensed from the distal end of the elevator onto the spreader belt of the spreader conveyor. The elevator can include an elevator belt with spaced slats designed to carry the harvested material from the lower proximal end to the higher distal end of the elevator. The spreader conveyor can spread the harvested material on the spreader belt as the harvested material is dispensed from each of the spaced slats at the distal end of the elevator.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
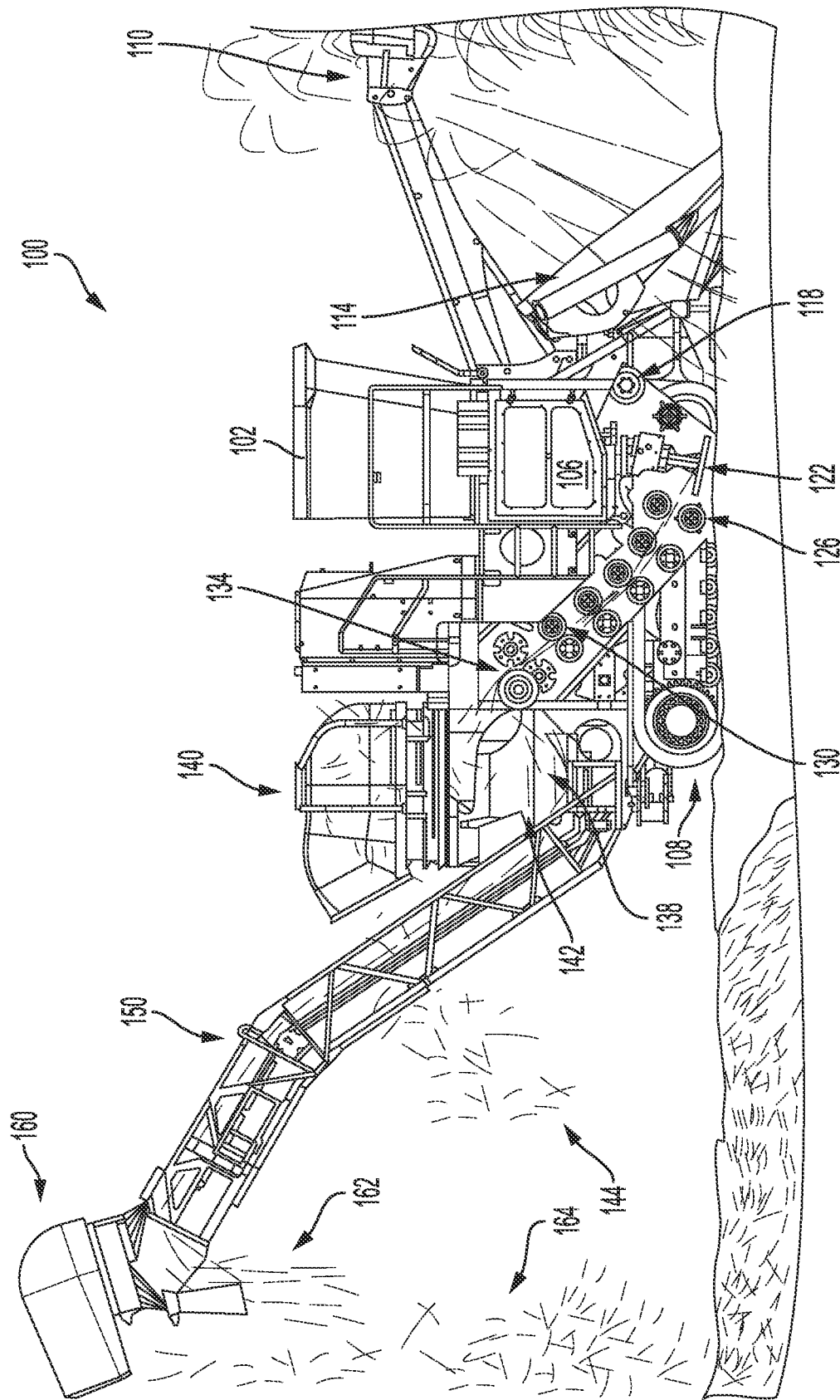
FIG. 1 illustrates an exemplary sugar cane harvester harvesting rows of standing sugar cane.

FIG. 1 illustrates an exemplary sugar cane harvester 100 for harvesting rows of standing sugar cane. The exemplary sugar cane harvester 100 includes an operator cab 102, an engine 106, track assemblies 108, a cane topper 110, a crop divider 114, knockdown rollers 118, a base cutter 122, butt lifters 126, feed rollers 130, a chopper system 134, an elevator basket 138, a primary extractor 140, an elevator 150, and a secondary extractor 160. The engine 106 provides power for driving the track assemblies 108 and other driven components of the harvester 100. Alternatively, the harvester could have wheels or other traction devices instead of the track assemblies 108.

The operator cab 102 is mounted in a position for observing operation of the cane topper 110 and crop dividers 114. The cane topper 110 cuts off the leafy material at the top of the sugar cane, this leafy material has little or no sugar content. The crop dividers 114 help separate the rows of sugar cane plants and feed them to the knockdown rollers 118 and base cutter 122. The base cutter assembly 122 is located below the engine 106 and between the track assemblies 108 for each row of cane stalks, and knockdown rollers 118 are located ahead of the base cutter assembly 122 for orienting the cane stalks to be cut by the base cutter assemblies 122.

The cut sugar cane is then fed by the butt lifters 126 into an upwardly and rearward oriented feed path defined between pairs of butt lifters 126 and feed rollers 130. The feed rollers 130 convey the stalks to the chopper system 134 to chop the stalks into billets 142, and the billets 142 and debris then pass through the primary extractor 140. The primary extractor 140 can include a fan or other separating mechanism to help separate and expel the leafy material and other debris 144 from the billets 142 as they pass through the primary extractor 140 to the elevator basket 138 below the primary extractor chamber 140. The elevator 150 conveys material, which includes the billets 142 and residual debris, from the elevator basket 138 to the secondary extractor 160.

Figure 2:
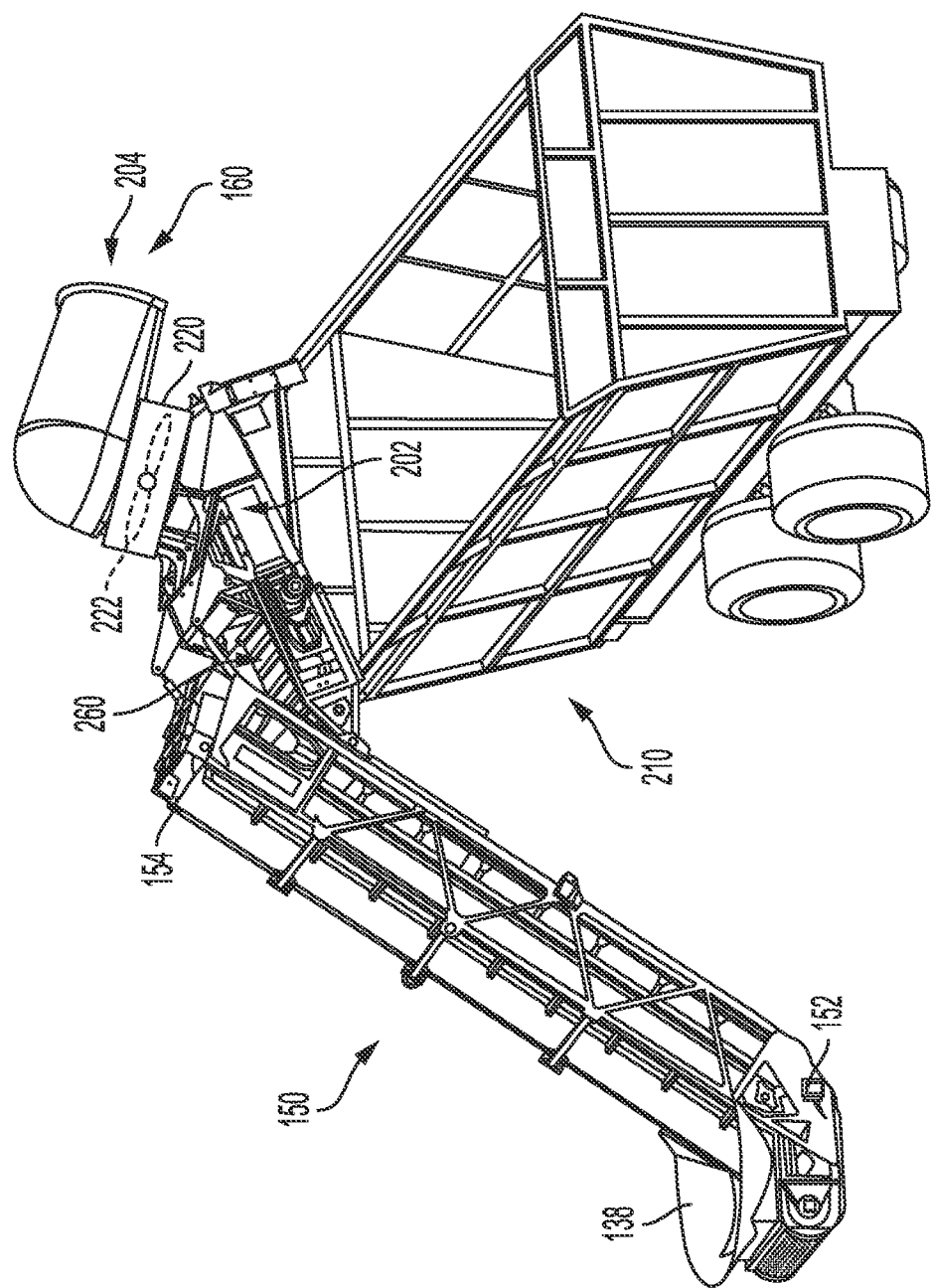
FIG. 2 illustrates a view of an elevator and secondary extractor with an exemplary spreader conveyor and wagon.
Figure 3:
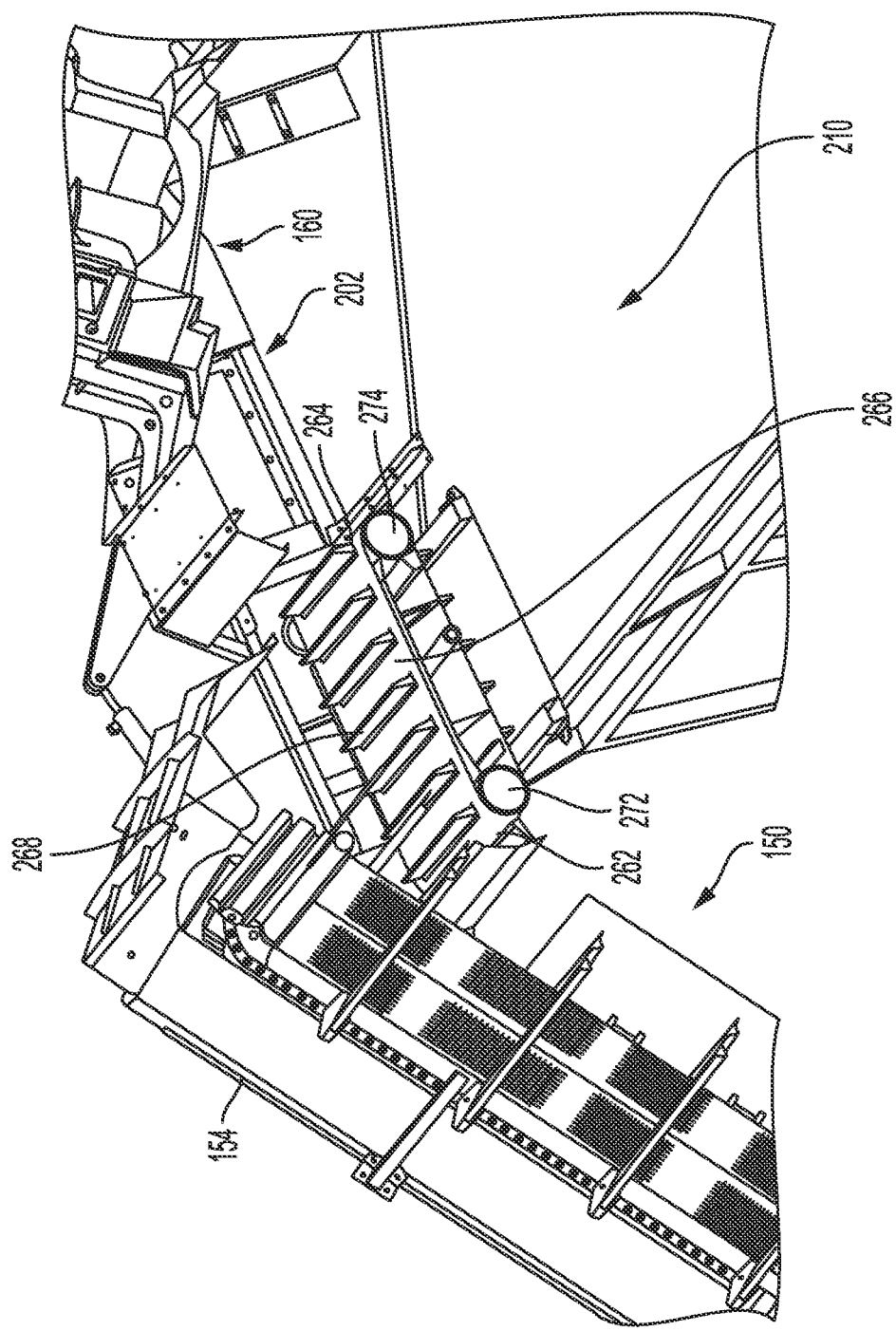
FIG. 3 illustrates a cross-section view of the elevator, secondary extractor, and spreader conveyor.
Figure 4:
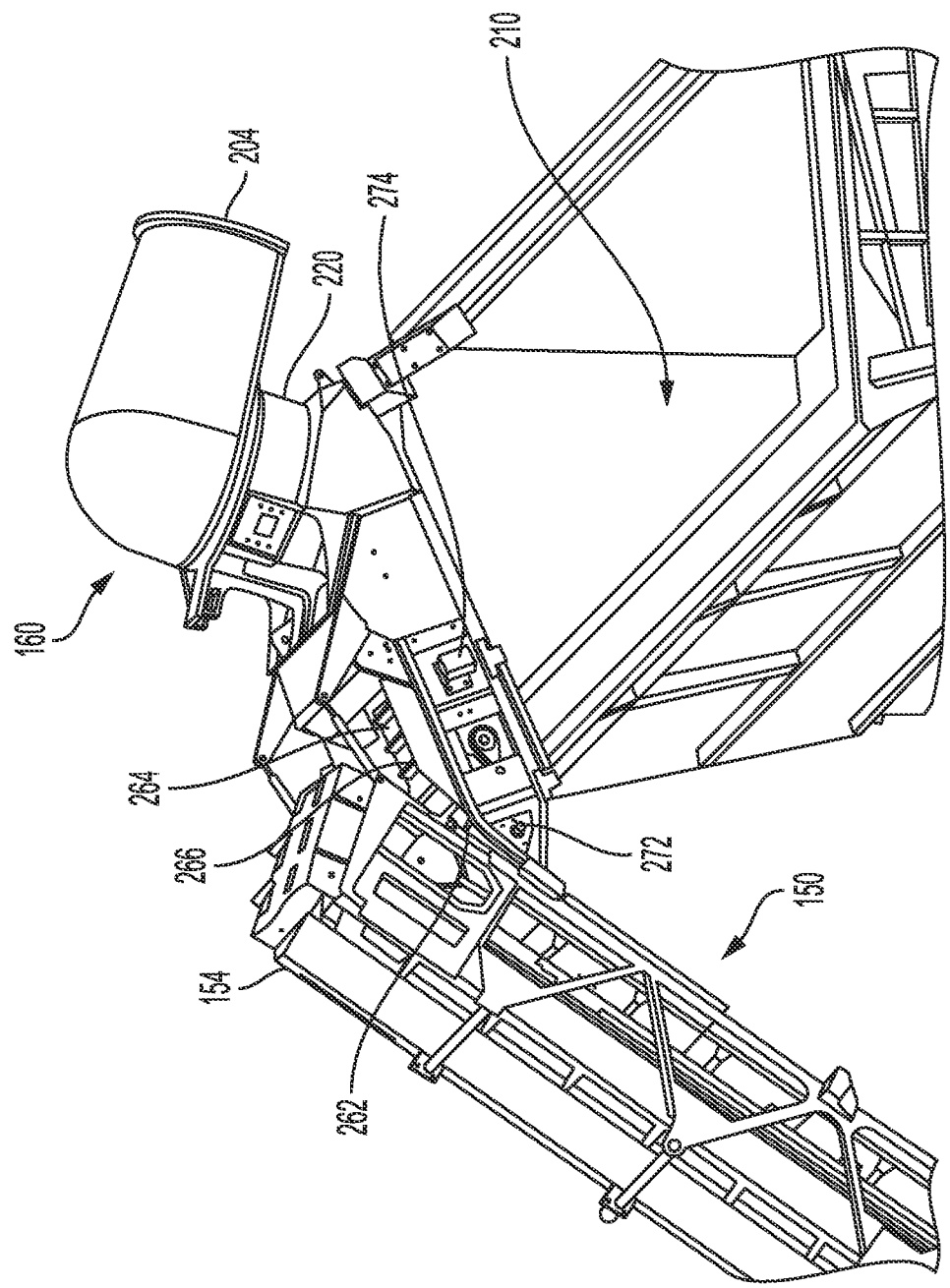
FIG. 4 illustrate closer view of the elevator, secondary extractor, and spreader conveyor.
Figure 5:
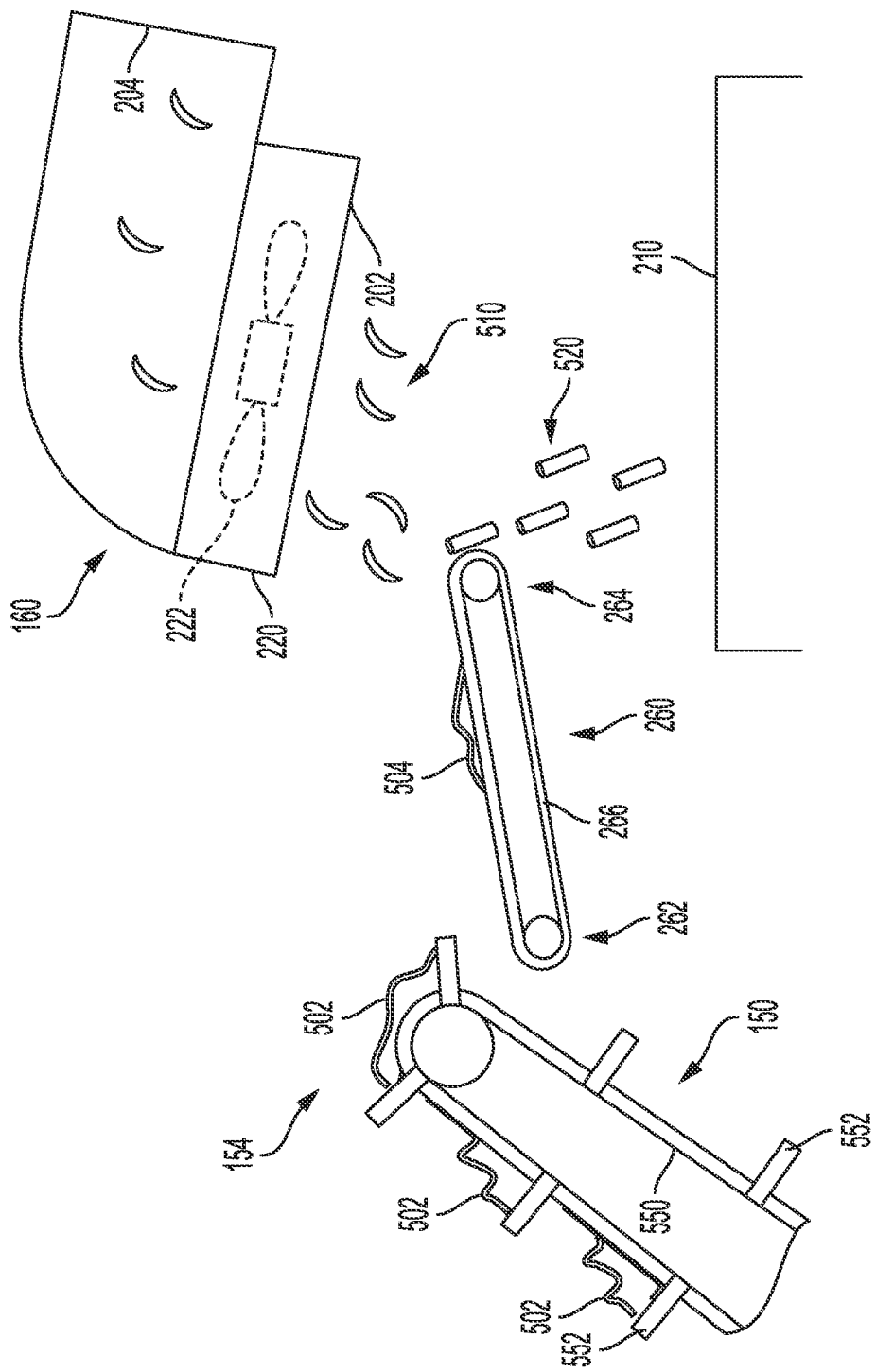
FIG. 5 illustrates harvest material being conveyed from the elevator to the spreader conveyor, and then presented to the secondary extractor.

FIG. 2 illustrates the elevator 150 and the secondary extractor 160, with an exemplary spreader conveyor 260 and a wagon 210. The elevator 150 includes a lower proximal end 152 coupled to the harvester 100, and a higher distal end 154 coupled to the secondary extractor 160, The spreader conveyor 260 includes a proximal end 262 coupled to the distal end 154 of the elevator 150, and a distal end 264 coupled to the secondary extractor 160, FIGS. 3 and 4 illustrate closer and cross-section views of the elevator 150, the secondary extractor 160, and the spreader conveyor 260. FIG. 5 illustrates harvest material being conveyed from the elevator 150 to the spreader conveyor 260, and then presented to the secondary extractor 160.

The secondary extractor 160 includes an air inlet 202, and air outlet 204, and a fan compartment 220 therebetween that includes an extractor fan 222. The extractor fan 222 is configured to pull air and debris 510 into the air inlet 202 and expel the air and debris 510 out the air outlet 204.

The spreader conveyor 260 includes a proximal roller 272, a distal roller 274 and a spreader belt 266. The proximal roller 272 is located at the proximal end 262 of the spreader conveyor 260, the distal roller 274 is located at the distal end 264 of the spreader conveyor 260, and the spreader belt 266 rotates about and extends between the proximal roller 272 and the distal roller 274, and rotates in an endless loop about the proximal roller and distal rollers 272, 274. The spreader conveyor 260 is configured to convey harvest material received from the elevator 150 and present it to the secondary extractor 160 for cleaning.

The elevator 150 includes an elevator belt 550 that extends from the lower proximal end 152 to the higher distal end 154, and rotates in an endless loop around the proximal and distal ends 152, 154 of the elevator 150. The elevator belt 550 includes spaced slats 552 that help carry harvested material 502 from the lower proximal end 152 to the higher distal end 154 of the elevator 150. As the harvested material 502 is lifted by the elevator 150, it tends to clump into clots or slugs against the adjacent slat 552. It is hard for the secondary extractor 160 to effectively clean the harvested material 502 when it is presented to the secondary extractor 160 in these slugs.

As shown in FIG. 5, the harvested material 502 falls off the distal end 154 of the elevator 150 and onto the proximal end 262 of the spreader conveyor 260. As the harvested material 502 falls off the elevator 150 onto the spreader conveyor 260, the slugs of harvested material 502 tend to spread out into smoothed material 504.

The smoothed harvested material 504 is thrown from the distal end 264 of the spreader conveyor 260 where it is presented to the secondary extractor 160. The air flow from the secondary extractor 160 pulls lighter debris 510 from the harvested material 504 and sucks the debris 510 into the air inlet 202 and expels it out the air outlet 204. The heavier sugar can billets 520 or desired crop material in the harvested material 504 then drop from the distal end 264 of the spreader conveyor 260 into the wagon 210.

The spreader conveyor 260 presents the harvested material 504 to the secondary extractor 160 in a way to improve cleaning. Currently, the harvested material 504 drops off of the elevator 150 as large clumps or slugs 502. This makes it difficult for the air from the extractor fan 222 to pull the leaves and trash 510 out of the harvested material 504. The spreader conveyor 260 feeds the harvested material 504 to the secondary extractor 160 in a smoother, more continuous flow so that less material is presented to the secondary extractor 160 at once. The spreader conveyor 260 does this by using a smoother conveyor belt 266 as opposed to the current chain belt 550 with slats 552 of the elevator 150. The spreader belt 266 can have a smooth surface (see FIG. 5) or have a ridged surface with periodic ridges 268 (see FIG. 3). The spreader conveyor 260 can be a flatbed, roller bed, modular belt, fiber glass, magnetic or other type of conveyor. The hydraulic circuits for the spreader conveyor 260 can be independent speed, synchronized speed, or some automated hydraulic circuits.

The spreader conveyor 260 receives the harvested material 502 from the top 154 of the elevator 150. The spreader conveyor 260 spreads out the clump of crop material 502 that comes off the elevator slat 552 by spreading out the crop material 504 on the spreader belt 276. The extractor fan 222 of the secondary extractor 160 can more effectively pull the leaves and other debris 510 from the sugarcane billets 520 when the harvested material is more spread out.

The elevator 150 can throw or drop the harvested material 502 from the distal end 154 of the elevator 150 to the spreader belt 276 of the spreader conveyor 260. The rotation speed of the spreader conveyor 260 can be varied to help spread the harvested material 502. The spreader conveyor 260 can run continuously to help prevent buildup of the harvested material 502 on the spreader belt 276. The distance from the distal end 264 of the spreader conveyor 260 to the air inlet 202 of the secondary extractor 160, and the angle of the air inlet 202 of the secondary extractor 160 to the spreader conveyor 260 can be customized to improve cleaning of the harvested material 502 by the secondary extractor 160.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

We claim:

1. A harvester for harvesting crops, the harvester comprising:
    an elevator with a lower proximal end that receives harvested material and a higher distal end that dispenses the harvested material;
    a spreader conveyor with a proximal end that receives the harvested material from the distal end of the elevator and a distal end that dispenses the harvested material; and
    a secondary extractor that includes an inlet and an outlet, wherein the secondary extractor is coupled to the distal end of the spreader conveyor;

wherein the secondary extractor includes an extractor fan operative to create an air flow to pull air into the inlet of the secondary extractor to extract debris from the harvested material dispensed from the distal end of the spreader conveyor and expel the debris out of the outlet of the secondary extractor;

wherein the distal end of the spreader conveyor is positioned to dispense the harvested material into the air flow created by the extractor fan of the secondary extractor.

2. The harvester of claim 1, wherein the spreader conveyor includes a spreader belt that rotates in an endless loop around the proximal and distal ends of the spreader conveyor, and the harvested material received from the distal end of the elevator spreads out on the spreader belt.

3. The harvester of claim 2, wherein the spreader belt has a smooth surface.

4. The harvester of claim 2, wherein the spreader belt has a ridged surface.

5. The harvester of claim 1, wherein the spreader conveyor is configured to throw the harvested material dispensed from the distal end of the spreader conveyor into the air flow created by the extractor fan of the secondary extractor.

6. The harvester of claim 5, wherein the elevator is configured to throw the harvested material dispensed from the distal end of the elevator onto the spreader belt of the spreader conveyor.

7. The harvester of claim 5, wherein the elevator is configured to drop the harvested material dispensed from the distal end of the elevator onto the spreader belt of the spreader conveyor.

8. The harvester of claim 5, wherein a rotation speed of the spreader belt of the spreader conveyor is adjustable.

9. The harvester of claim 5, wherein the spreader belt of the spreader conveyor is configured to continuously rotate during a harvest operation.

10. The harvester of claim 9, wherein the distance from the distal end of the spreader conveyor to the air inlet of the secondary extractor is adjustable.

11. The harvester of claim 10, wherein the angle of the air inlet of the secondary extractor relative to the spreader conveyor is adjustable.

12. The harvester of claim 9, wherein the angle of the air inlet of the secondary extractor relative to the spreader conveyor is adjustable.

13. The harvester of claim 5, wherein desired crop material in the harvested material is not drawn into the inlet of the secondary extractor, and the spreader conveyor is configured to dispense the desired crop material into a wagon.

14. The harvester of claim 13, wherein a rotation speed of the spreader belt of the spreader conveyor is adjustable.

15. The harvester of claim 13, wherein the spreader belt of the spreader conveyor is configured to continuously rotate during a harvest operation.

16. The harvester of claim 13, wherein the distance from the distal end of the spreader conveyor to the air inlet of the secondary extractor is adjustable.

17. The harvester of claim 13, wherein the angle of the air inlet of the secondary extractor relative to the spreader conveyor is adjustable.

18. The harvester of claim 13, wherein the elevator includes an elevator belt with a plurality of spaced slats configured to carry the harvested material from the lower proximal end to the higher distal end of the elevator; and the spreader conveyor is configured to spread the harvested material on the spreader belt as the harvested material is dispensed from each of the plurality of spaced slats at the distal end of the elevator.

19. The harvester of claim 18, wherein a rotation speed of the spreader belt of the spreader conveyor is adjustable to spread the harvested material on the spreader belt as the harvested material is dispensed from each of the plurality of spaced slats at the distal end of the elevator.

\* \* \* \* \*